(12) United States Patent
Braithwaite

(10) Patent No.: US 8,718,542 B2
(45) Date of Patent: May 6, 2014

(54) CO-LOCATION OF A PICO ENB AND MACRO UP-LINK REPEATER

(75) Inventor: Richard Neil Braithwaite, Orange, CA (US)

(73) Assignee: Powerwave Technologies S.a.r.l., Luxembourg (LU)

( * ) Notice: Subject to any disclaimer, the term of this patent is extended or adjusted under 35 U.S.C. 154(b) by 403 days.

(21) Appl. No.: 12/888,295

(22) Filed: Sep. 22, 2010

(65) Prior Publication Data

US 2011/0070824 A1    Mar. 24, 2011

Related U.S. Application Data

(60) Provisional application No. 61/245,194, filed on Sep. 23, 2009.

(51) Int. Cl.
*H04B 7/15* (2006.01)
*H04B 7/14* (2006.01)
*H04B 3/36* (2006.01)
*H04W 36/00* (2009.01)

(52) U.S. Cl.
USPC .................. 455/11.1; 455/7; 455/9; 455/15; 455/444

(58) Field of Classification Search
USPC ..................... 455/11.1, 7, 9, 15, 16
See application file for complete search history.

(56) References Cited

U.S. PATENT DOCUMENTS

| | | | | |
|---|---|---|---|---|
| 5,152,010 A | * | 9/1992 | Talwar | 455/136 |
| 6,125,109 A | * | 9/2000 | Fuerter | 370/315 |
| 6,804,491 B1 | * | 10/2004 | Uesugi | 455/11.1 |
| 2009/0029645 A1 | * | 1/2009 | Leroudier | 455/7 |
| 2009/0291632 A1 | | 11/2009 | Braithwaite et al. | |
| 2010/0144356 A1 | * | 6/2010 | Li et al. | 455/446 |
| 2011/0281590 A1 | * | 11/2011 | Frederiksen et al. | 455/449 |

OTHER PUBLICATIONS

Avneesh Agrawal, "Heterogeneous Networks a new paradigm for increasing cellular capacity," Jan. 2009, available at http://netseminar.stanford.edu/seminars/01_29_09.pdf.

* cited by examiner

*Primary Examiner* — Tilahun B Gesesse
(74) *Attorney, Agent, or Firm* — Verrill Dana, LLP; Chris A. Caseiro

(57) ABSTRACT

A wireless communication system and method comprising co-location of a pico evolved node B ("eNB") and a macro up-link repeater is disclosed. User Equipment ("UE") communicates with a macro eNB via the up-link repeater with reduced transmission power as compared to the transmission power required for the UE to communicate directly with the macro eNB. As a result, the UE does not desensitize the pico eNB receiver. The up-link repeater comprises a donor antenna that radiates a highly directional beam to the macro eNB.

18 Claims, 6 Drawing Sheets

CO-LOCATION OF A PICO ENB AND MACRO UP-LINK REPEATER

RELATED APPLICATION INFORMATION

The present application claims priority under 35 U.S.C. Section 119(e) to U.S. Provisional Patent Application Ser. No. 61/245,194 filed Sep. 23, 2009, the disclosure of which is incorporated herein by reference in its entirety.

BACKGROUND OF THE INVENTION

1. Field of the Invention

The present invention relates in general to radio communication systems for wireless networks. More particularly, the invention is directed to wireless heterogeneous cellular networks.

2. Description of the Prior Art and Related Background Information

Heterogeneous networks combine macro and pico base stations within a wireless communication system. In general, locating several pico base stations within the cell coverage of a macro base station will increase the capacity of the network. However, interference between the macro and pico base stations must be managed.

Accordingly, a need exists to improve heterogeneous network operation.

SUMMARY OF THE INVENTION

In the first aspect, the present invention provides a wireless communication system comprising a first base station that is configured for communication within a first cell. A second base station is configured for communication within a second cell, where the second cell is smaller than the first cell and configured within the first cell. A repeater is co-located with the second base station, where the repeater is configured for receiving signals within a service area and re-transmitting the received signals as a directed beam to the first base station.

In a preferred embodiment of the wireless communication system, user equipment (UE) is located within the service area, where the UE is configured for transmitting the signals to the repeater. The second base station further comprises a second base station antenna, where the repeater further comprises a repeater service antenna configured for communication with the UE. The transmission power of the UE preferably is established such that receiver desensitization of the second base station antenna is avoided. The repeater co-located with the second base station preferably further comprises the second base station antenna comprising the repeater service antenna. In an embodiment of the present invention, the repeater co-located with the second base station further comprises the second base station and the repeater each affixed to the same tower. The wireless communication system further comprising a plurality of additional base stations each configured for communication within a corresponding plurality of additional cells, wherein each additional cell is smaller than the first cell and is located within the first cell. A plurality of additional repeaters each co-located with a corresponding additional base station, wherein each additional repeater is configured for receiving signals within a corresponding service area and re-transmitting the received signals as a directed beam to the first base station. The service area preferably is a region in which the first base station receives signals emitted by the UE via the repeater that are greater than signals sent directly from the UE to the first base station. The second cell preferably is enclosed within the service area. In an embodiment, the wireless system comprises a Long Term Evolution ("LTE") system, wherein the first base station comprises a macro evolved node B (eNB), the repeater comprises a macro up-link repeater, and the second base station comprises a pico eNB.

In another aspect, the present invention provides a method for wireless communication, comprising receiving signals C01b emitted by a first 501 user equipment (UE) by a first base station 530 within a service area 530a receiving signals C01a emitted by a first 501 user equipment (UE) by a repeater 540 within a service area 540a using a first antenna 425, re-transmitting the received signals as a directed beam 541 using a second antenna 421 to a first base station 530, establishing combined signal level of received signals from UE 501 and from repeater 540 at first base station 530, and reducing the transmission power of the first UE 501 such that receiver of Pico eNB 520 desensitization is avoided based on said combined received signal levels.

The service area is defined by a region in which the first base station receives signals emitted by the UE via the repeater that are greater than the signals sent directly from the UE to the first base station. The second transmission device preferably communicates within a second cell that is enclosed within the service area. The repeater, the first base station, and the second transmission device comprise a Long Term evolution ("LTE") system, wherein the repeater further comprises a macro up-link repeater, the first base station further comprises a macro evolved node B (eNB), and the second base station further comprises a pico evolved node B (eNB).

In another aspect, the present invention provides a method for wireless communication including transmitting signals employing a first base station to a User Equipment (UE) located within a first cell. Whether the UE is within a service area of a repeater co-located with a second base station is determined, where the repeater co-located with the second base station is one of a plurality of repeaters co-located with a plurality of second base stations each having second base station cells smaller than the first cell and configured within the first cell. The transmission power level of the UE is established. Signals emitted from the UE are received by the repeater. The received signals are re-transmitted as a directed beam to the first base station.

In a preferred embodiment, signals to the UE from the second base station are transmitted using a first antenna, where receiving signals from the UE by the repeater further includes receiving signals using the first antenna. The transmission power level of the UE is established such that receiver desensitization of the first antenna is avoided. The service area preferably includes a region in which the first base station receives signals emitted by the UE via the repeater that are greater than the signals sent directly from the UE to the first base station, where the second base station cell is enclosed within the service area. The repeater, the first base station, and the second transmission device comprise a Long Term evolution ("LTE") system, wherein the repeater further comprises a macro up-link repeater, the first base station further comprises a macro evolved node B (eNB), and the second base station further comprises a pico evolved node B (eNB).

Further features and aspects of the invention are set out in the following detailed description.

DETAILED DESCRIPTION OF THE INVENTION

The present invention prevents the desensitization of the receiver of a base station having lower power by co-locating a repeater with the base station having lower power. In an embodiment of the present invention, an User Equipment ("UE") communicates with a base station having higher power via the repeater. In one or more embodiments of the present invention, the UE communicates with the repeater with reduced transmission power as compared to the transmission power required for the UE to communicate directly with the base station having higher power. As a result, the UE does not desensitize the receiver of the base station having lower power. The repeater has a donor antenna that radiates a highly directional beam to the macro eNB.

One or more embodiments of the present invention is directed to a system for improving wireless networks and is not necessarily based on one or more technical specifications. For the purposes of illustrating examples of the present invention, one or more embodiments will be described based on the technical standards related to the Long Term Evolution ("LTE") technical standard. However, the description is not intended to limit the invention to the form disclosed herein, and is not intended to limit the invention to embodiments related to the LTE technical standard.

Figure 1:
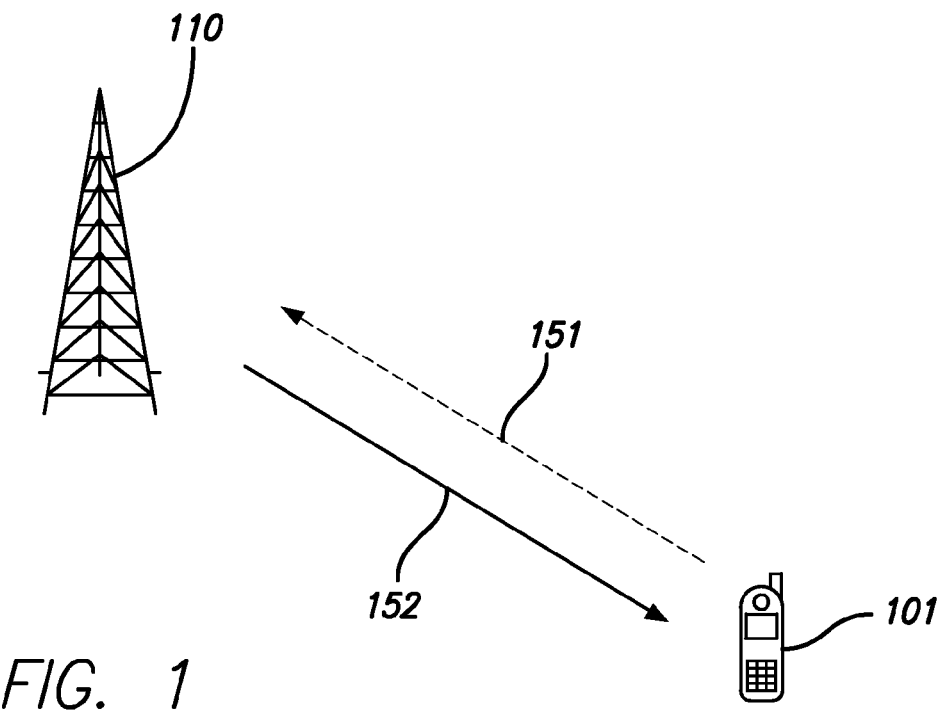
FIG. 1 is a representation of an eNB Basestation and an UE system for wireless up-link and down-link communications.

Wireless communication systems enable the transfer of data between a basestation and a mobile subscriber over an air interface confined to allocated frequency bands. For LTE, a radio access technology that is part of the long term evolution of Universal Mobile Telecommunications System ("UMTS"), the mobile subscriber and base station are referred to as user equipment ("UE") and the evolved node B ("eNB"), respectively. Teachings related to LTE discussed in the 3 GPP Specification such as "3GPP: Technical Specification Group Radio Access Network; E-UTRA; Physical Channels and Modulation, 3GPP spec 36.211 V8.6.0 (2009-03)" and "3GPP TR 25.913. Requirements for Evolved UTRA (E-UTRA) and Evolved UTRAN (E-UTRAN)," both available at http://www.3gpp.org., may be employed herein and are incorporated herein by reference in its entirety. As depicted in FIG. 1, the data transfer from the UE 101 to the eNB 110 is referred to as the Up-Link Transmission 151 and the data transfer from the eNB 110 to UE 101 is referred to as the Down-Link Transmission 152.

Figure 2:
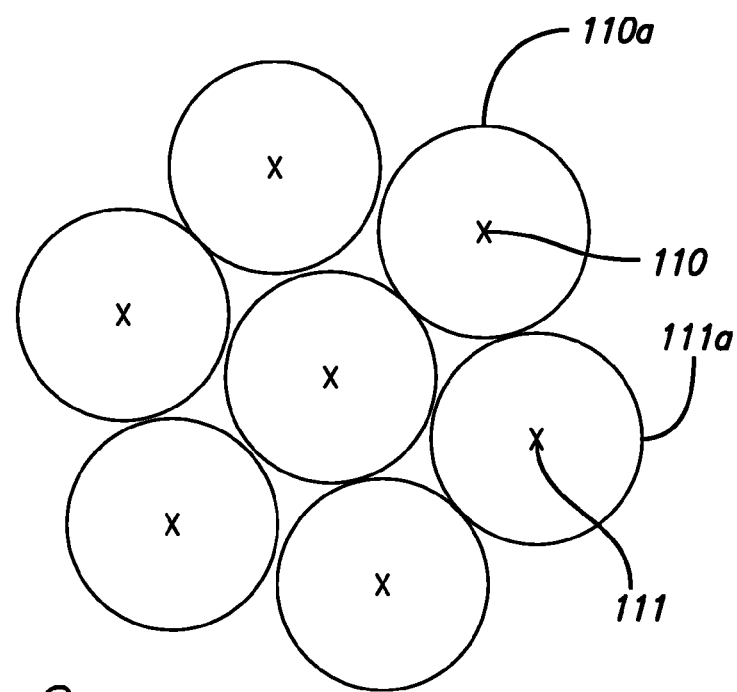
FIG. 2 is a representation of a homogeneous network in which the cell sizes of the eNBs are similar and the eNBs are placed in a regular pattern.

The propagation losses of RF energy in air reduce the power of a transmitted signal over distance, which in turn limits the separation of the eNB and UE where data transfers will be successful. As a result, each eNB has a range limit that defines an area referred to as the cell size. To provide widespread coverage, wireless communication systems are implemented as a cellular network of eNBs, as shown in FIG. 2. FIG. 2 is a representation of a homogeneous network comprising multiple eNBs placed in a regular pattern depicted here as First eNB 110 and Second eNB 111 having similar cell sizes illustrated by First eNB Cell Edge 110a and Second eNB Cell Edge 111a. The spacing of eNBs is selected to obtain full coverage of an area while limiting the overlap between cells. The capacity of the network, in terms of potential data throughput between the eNBs and UE's, is proportional to the density of the cells.

LTE has features to reduce interference between up-link signals from UEs within a common cell. The eNB controlling the cell sends messages to the UEs to adjust their transmitted power and timing advance so that the up-link signals arrive at the eNB receiver at the same power level for a given coding rate and at the same time. Time alignment at the eNB receiver makes the UE up-link signals orthogonal within the cell. As a result, there is no interference between UEs within a cell at the eNB receiver. The cyclic prefix added to the OFDM waveform of the LTE modulation format allows a modest timing spread, typically 4.7 microseconds, between the up-link signals arriving at the eNB receiver without introducing interference.

The up-link power control of the UEs is designed to compensate for the path loss between the UE and eNB. UEs near the cell edge will be transmitting at a higher power level, for a given coding rate, because of the increased distance between the UE and eNB. Note that the UE transmit power is also increased for higher coding rates so that the signal-to-noise at the eNB receiver is sufficient for the chosen block error rate.

As depicted in FIG. 2, an exemplary homogeneous network topology comprises cells that are of similar size and eNB placement that is in a regular pattern. In a homogeneous network, the problem of interference between neighboring eNBs can be addressed in several ways. A classic method is to split the available bandwidth into smaller, disjoint spectral bands, referred to as carriers. For a hexagonal grid of eNBs, the available bandwidth can be split into three carriers and the carrier assignment can be made so that neighboring cells are using different spectral bands. This type of network frequency planning is referred to as a 3-to-1 reuse.

Figure 3:
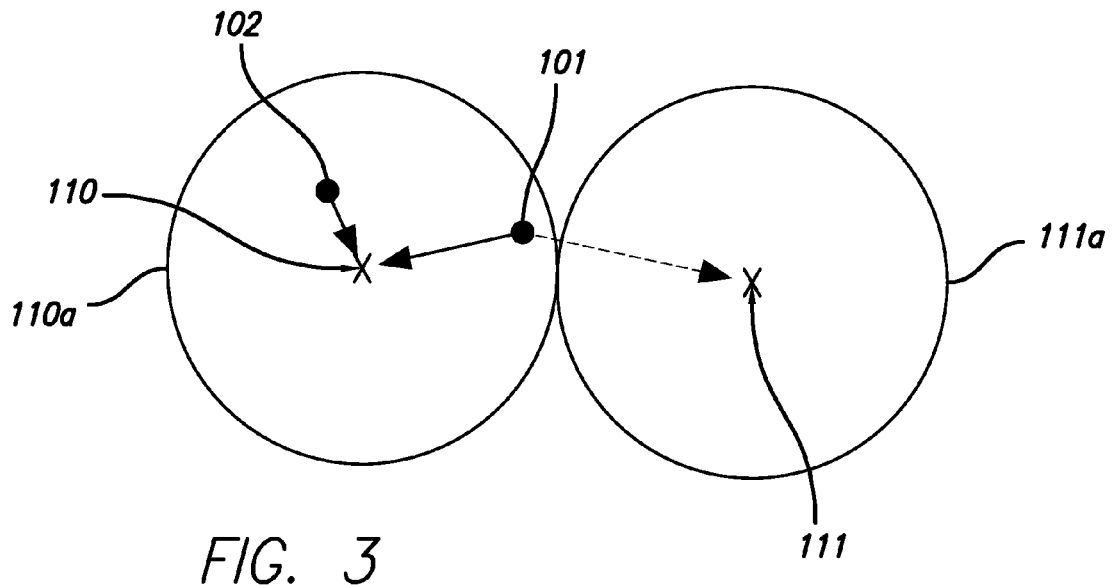
FIG. 3 is a representation of a homogeneous network in which a first UE near cell edges transmits at a higher power level than second UE to compensate for the increased path loss to the first eNB which introduces more interference to the receiver of second eNB.

In LTE networks, the UE transmissions appear as interference to the receivers of neighboring eNBs. As depicted in FIG. 3, the problem of interference is most severe when a First UE 101 is located near First eNB Cell Edge 110a and Second eNB Cell Edge 111a. In this example, the transmission of First UE 101 does not interfere with the up-link reception at First eNB 110 because of the timing control, but it does interfere with the up-link reception at Second eNB 111. The higher transmission power of First UE 101 and its closer proximity to Second eNB 111 make the interference from First UE 101 more significant than that of Second UE 102.

Newer modulation formats such as LTE use a 1-to-1 reuse for the network frequency planning, which means that the entire bandwidth is available for use in each cell. This creates potential interference problems when a UE is near the cell edge. Various types of interference coordination are available including applying a 3-to-1 reuse frequency plan for UEs near the cell edge or negotiating between neighboring eNBs over a wired connection for a favorable frequency sharing assignment at the cell edges that avoids interference. This wired connection is referred to as the X2 interface. The schedulers within the neighboring eNBs can make the adjustments in frequency assignments in real time to use only the resources reserved during the negotiation for cell edge users.

Figure 4:
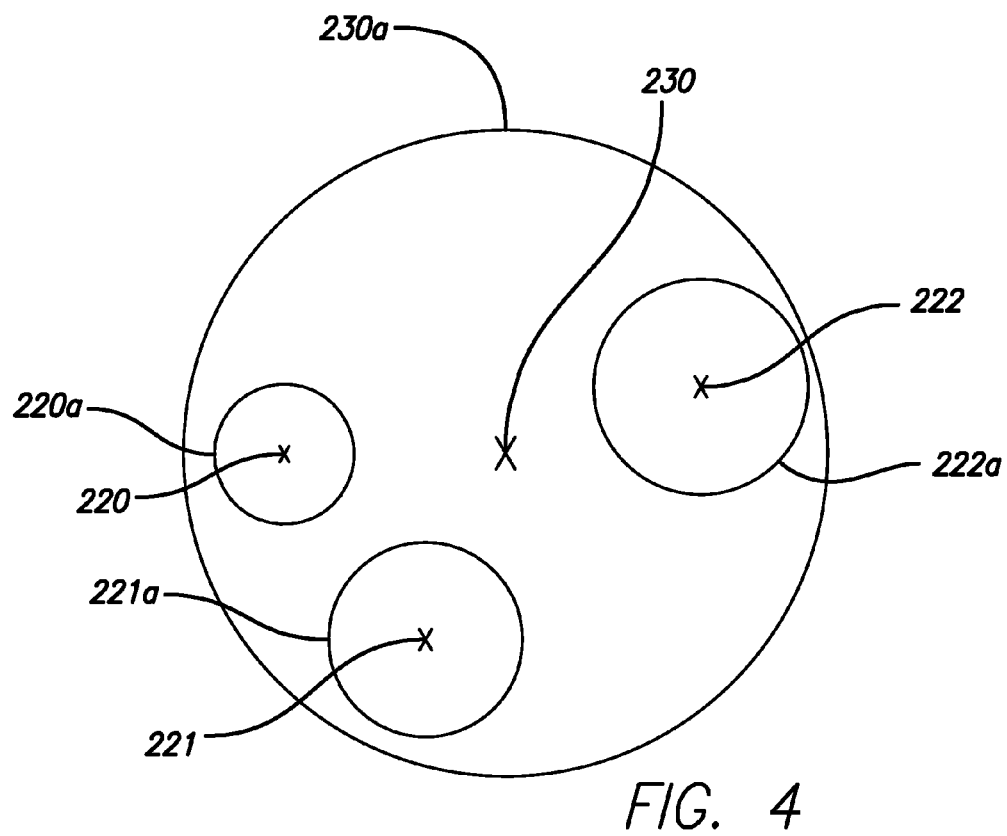
FIG. 4 is a representation of a heterogeneous network having several pico eNBs located within the cell covered by a macro eNB in which the pico eNBs use the carrier frequency band vacated by the macro eNB.

Heterogeneous network topologies, as shown in FIG. 4, are an alternative to the homogeneous topology shown in FIG. 2. Heterogeneous networks differ from homogeneous networks as cells of different sizes are allowed to co-exist in the same area. For example, the network can combine Macro eNB 230 and First Pico eNB 220, Second Pico eNB 221, and Third Pico eNB 222, where Macro eNB 230 transmits at power levels on the order of 43 dBm and First Pico eNB 220, Second Pico eNB 221, and Third Pico eNB 222 transmit at power levels on the order of 23 dBm. As such, Macro eNB Cell Edge 230a is significantly larger than Pico eNB Cell Edge 220a, Second Pico eNB Cell Edge 221a, and Third Pico eNB Cell Edge 222a. In the heterogeneous network, First Pico eNB 220, Second Pico eNB 221, and Third Pico eNB 222 may be placed within the Macro eNB Cell Edge 230a. The motivation for mixing cell sizes is that UEs are often clustered together, referred to as a hot spot, and in such cases they are better serviced by a pico eNB than the macro eNB. Unfortunately, placing First Pico eNB 220, Second Pico eNB 221, and Third Pico eNB 222 within Macro eNB Cell Edge 230a creates interference problems that must be addressed. Interference problems may be addressed by splitting the available bandwidth between the Macro eNB 230 and the pico eNBs to create two disjoint carriers and a 2-to-1 frequency reuse plan. One or more of First Pico eNB 220, Second Pico eNB 221, and Third Pico eNB 222 within the Macro eNB Cell Edge 230a may use the same carrier vacated by Macro eNB 230 if the cell edges of First Pico eNB 220, Second Pico eNB 221, and Third Pico eNB 222 do not overlap with each other. Although the two carrier split reduces the capacity and peak data throughput of Macro eNB 230, the overall capacity of the combination is larger assuming two or more of First Pico eNB Cell Edge 220a, Second Pico eNB Cell Edge 221a, and Third Pico eNB Cell Edge 222a are present within the Macro eNB Cell Edge 230a.

Figure 5:
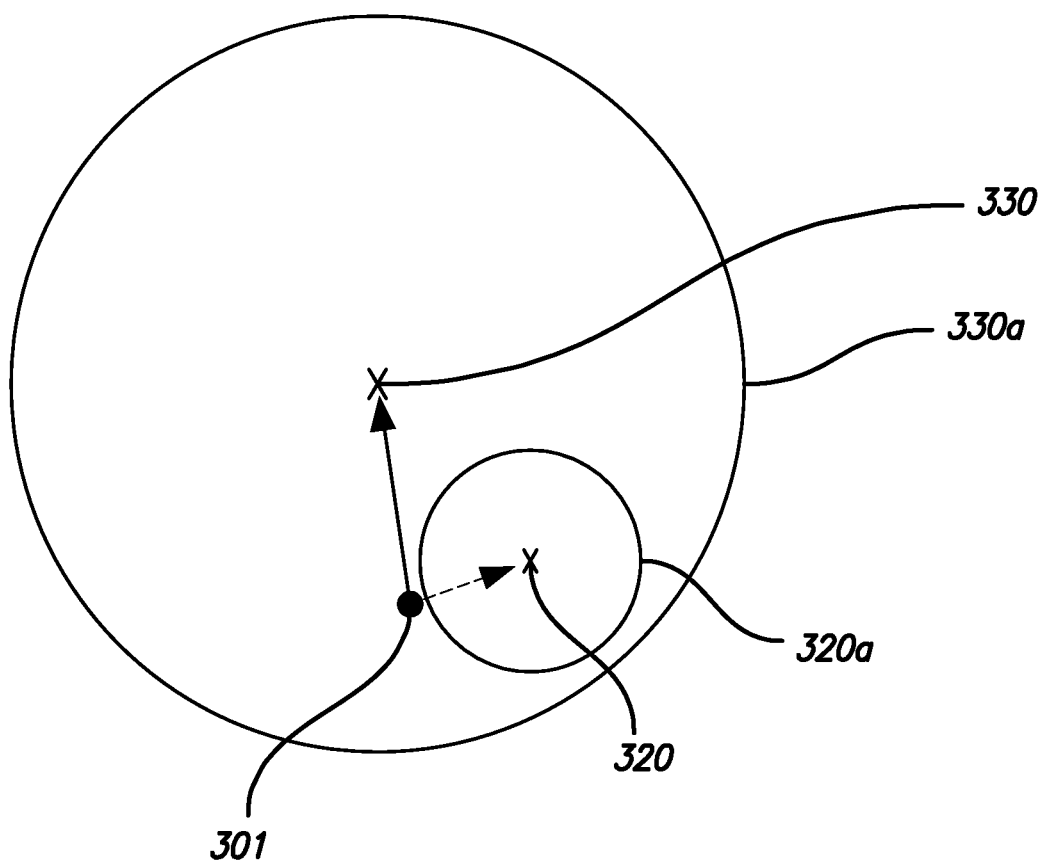
FIG. 5 is a representation of a heterogeneous network in which an UE desensitizes the receiver of the pico eNB even though the macro and pico cells are using different carrier frequency bands.

The 2-to-1 frequency reuse does not solve entirely the problem of interference between macro and pico eNBs. FIG. 5 is a representation of a heterogeneous network in which First UE 301 desensitizes the receiver of Pico eNB 320 even though Macro eNB 330 and Pico eNB 320 are using different carrier frequency bands. The desensitization of the receiver of Pico eNB 320 may occur when First UE 301 is located near the edge of the Pico eNB Cell Edge 320a. The unwanted macro carrier will consume the dynamic range of the receiver of Pico eNB 320. This occurs because Pico eNB 320 is designed to capture the available bandwidth which includes the carrier of the macro cell. The severity of the problem is related to the difference in the path losses between the First UE 301-to-Macro eNB 330 and First UE 301-to-Pico eNB 320. When First UE 301 is near Pico eNB Cell Edge 320a, the First UE 301 may transmit an additional 20 dB of power when communicating with the Macro eNB 330 instead of Pico eNB 320.

Figure 6:
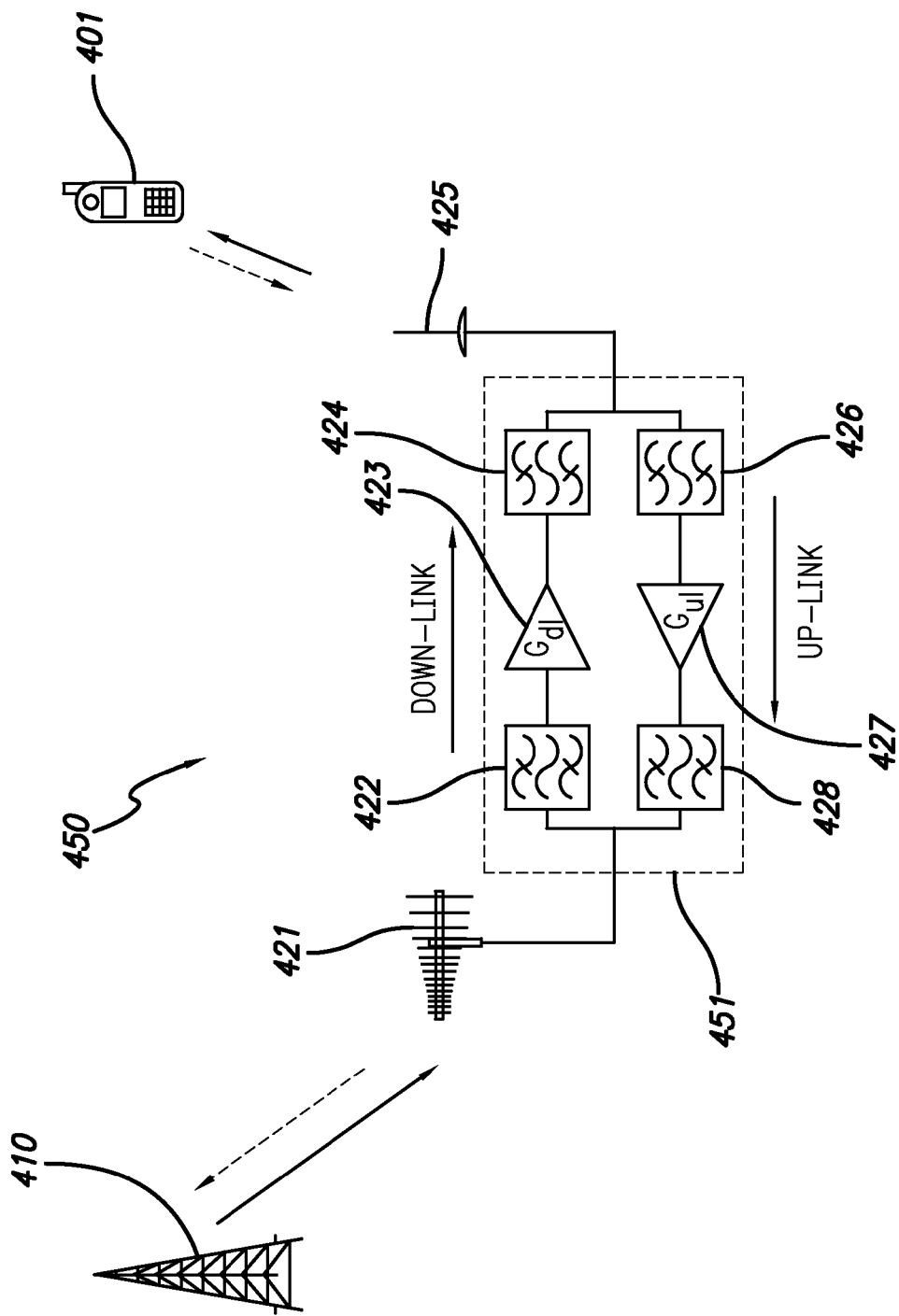
FIG. 6 is a system block diagram of a repeater having a donor antenna with a highly directional radiation pattern pointing toward the eNB and a service antenna having a broader radiation pattern to connect with UEs in the service area of the repeater.

Repeaters are used typically in cellular networks to improve the links connecting the UE to the eNB for both up-link and down-link transmissions. FIG. 6 is a system block diagram of a repeater having a donor antenna with a highly directional radiation pattern pointing toward the eNB and a service antenna having a broader radiation pattern to connect with UEs in the service area of the repeater. In one or more embodiments of the present invention, Repeater 450 comprises Donor Antenna 421, Repeater Circuitry 451, and Service Antenna 425.

Donor Antenna 421 and Service Antenna 425 have radiation patterns such that the isolation between Donor Antenna 421 and Service Antenna 425 is greater than the gain of Repeater Circuitry 451. Donor Antenna 421 has a highly directional radiation pattern that points toward eNB 410. Service Antenna 425 communicates with UE 401 and has a broader radiation pattern corresponding to an omni-directional pattern. Donor Antenna 421 and Service Antenna 425 must be sufficiently isolated which may be accomplished with the Service Antenna 425 radiating a cardioid pattern with the null placed in the direction of eNB 410. If the delay through Repeater 450 is less than the length of the cyclic prefix used in the OFDM signal (typically 4.7 microseconds for LTE), Repeater 450 will enhance the up-link signal received at the eNB 410 and provide diversity. The improvement in the up-link quality provided by the repeater allows the UE transmit power level to be reduced. Details of a repeater design are shown in U.S. Publication No. 2009/0291632 which may be employed herein and the disclosure of such patent is incorporated by reference in its entirety.

Repeater 450 requires filtering to limit the bandwidth of the repeated signals. The primary requirement is that the filter attenuates frequencies outside the macro carrier band. In particular, carrier frequencies associated with the pico eNBs should be attenuated. In an embodiment of the present invention, Repeater Circuitry 451 filters and amplifies both the up-link and down-link signals. Down-Link signals sent by eNB 410 are received by Donor Antenna 421 and processed by First Down-Link Bandwidth Filter 422. The down-link signals are then amplified by Down-Link Amplifier 423. The down-link signals are further processed by Second Down-Link Bandwidth Filter 424. The down-link signals are then fed into Service Antenna 425 which transmits the signals to UE 401. Up-link signals sent by UE 401 are received by Service Antenna 425 and are processed by First Up-Link Bandwidth Filter 426. The up-link signals are then amplified by Up-Link Amplifier 427 and then processed by Second Up-Link Bandwidth Filter 428. The uplink signals are then fed into Donor Antenna 421 which transmits the up-link signals to eNB 410. Filtering may be in the form of analog filtering, digital filtering, or a series combination of analog and digital filtering.

Figure 7:
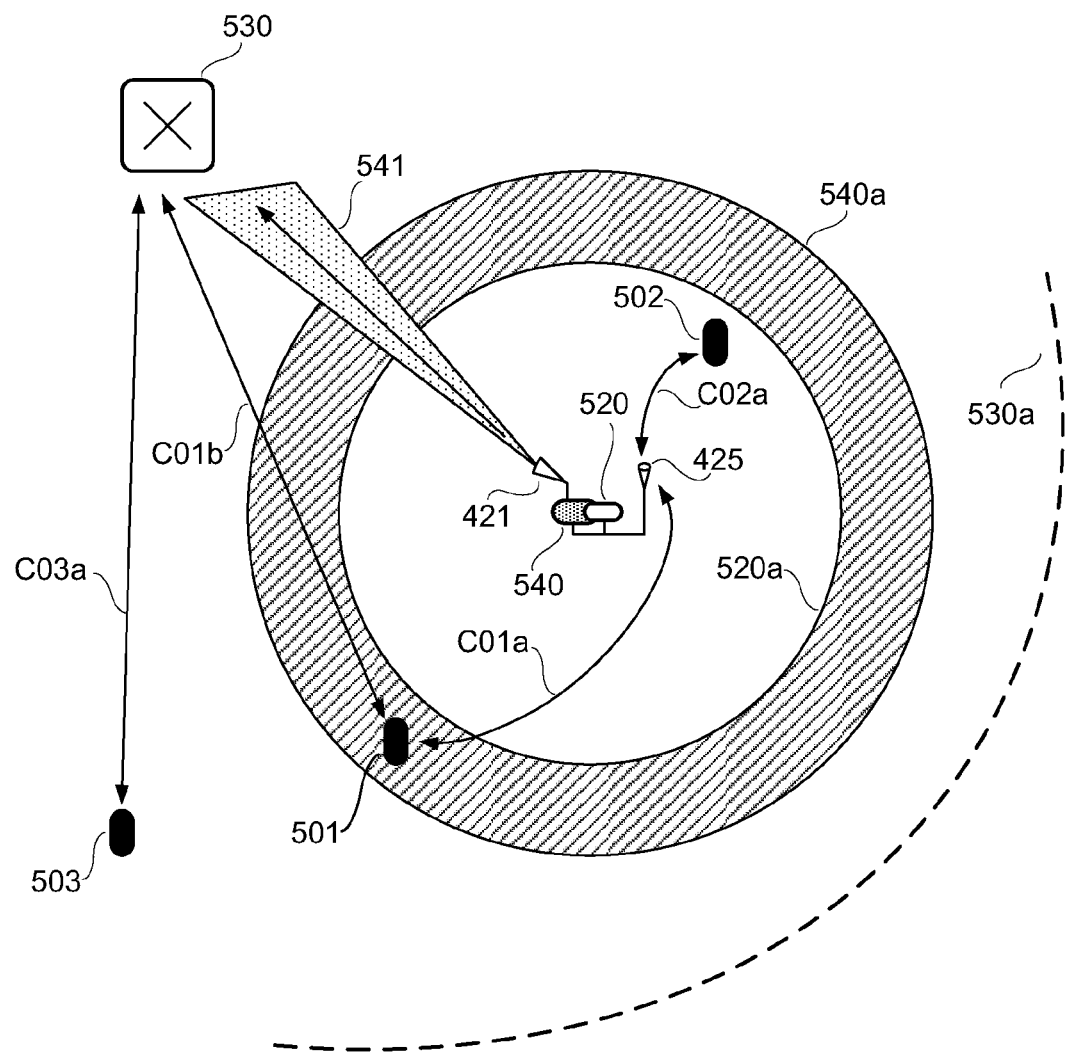
FIG. 7 is a schematic representation of a pico eNB co-located with a macro up-link repeater in one or more embodiments of the present invention.

FIG. 7 is a representation of Pico eNB 520 co-located with Repeater 540 in one or more embodiments of the present invention. Macro eNB 530 has a corresponding Macro eNB Cell Edge 530a and Pico eNB 520 has a corresponding Pico eNB Cell Edge 520a. FIG. 7 illustrates an embodiment in which Repeater 540 and Pico eNB 520 are co-located while being physically separated. In one or more embodiments, the co-location of Pico eNB 520 and Repeater 540 may be implemented by having the service antenna 425 of Repeater 540 sharing the same antenna as the transceiver (not shown) of Pico eNB 520. In one or more embodiments, Repeater 540 may share the same antenna tower as Pico eNB 520.

In one or more embodiments of the present invention, First UE 501 communicates with Macro eNB 530 via Repeater 540 using lower transmission power as compared to First UE 501 communicating directly C01*b* with Macro eNB 530. When First UE 501 communicates C01*a* via Repeater 540 employing a lower transmission power, the receiver of Pico eNB 520 will not be desensitized. The donor antenna 421 of Repeater 540 communicates with Macro eNB 530 employing a Highly Directional Radiation Pattern 541 pointing to Macro eNB 530. Operationally, a distantly positioned Third UE 503 will communicate C03*a* with Macro eNB 530 directly since it is located outside service area 540*a* of Repeater 540.

In one or more embodiments, the service area is defined as the area where Macro eNB 530 receives more power via Repeater 540 than it does from the direct path from First UE 501 to Macro eNB 530. The service area becomes a UE quiet zone because of the reduction in the UE transmission power. In one or more embodiments of the present invention, the service area of Repeater 540 is similar in size to Pico eNB Cell Edge 520*a*. In one or more embodiments, the service area 540*a* of Repeater 540 is larger than Pico eNB 520 Cell Edge 520*a*.

If Repeater Cell Edge 540*a* on the service antenna side is larger than that of Pico eNB Cell Edge 520*a*, a buffer zone is created around Pico eNB Cell Edge 520*a* where First UE 501 communicating C01*a* with Macro eNB 530 through Repeater 540 will be transmitting at a power level comparable C02*a* to the UE's such as Second UE 502 communicating with Pico eNB 520. As a result, the macro UEs such as First UE 501 will not desensitize the receiver of Pico eNB 520. This assumes that the scheduler within Macro eNB 530 does not increase the coding rate for the up-link of the UE in response to the improved signal-to-noise ratio provided by the repeater.

In one or more embodiments, communications between Pico eNB 520 and Macro eNB 530 over the X2 (wireline) interface may be used to ensure that power reduction is selected over increased coding rate. In one or more embodiments of the present invention, donor antenna of Repeater 540 emits a directional radiation pattern 541 having a narrow beam width that is directed to Macro eNB 530 such that the RF coupling between the donor antenna 421 and the service antenna 425 of Repeater 540 is minimized. The isolation between the donor 421 antenna and the service 425 antenna of Repeater 540 must be greater than the gain of Repeater 540. In one or more embodiments of the present invention, the radiation of the service antenna has a shape of a cardioid null pattern. When the service antenna of Repeater 540 has radiation pattern with a cardioid null, the radiation pattern of the antenna used by Pico eNB 520 should be similar so that Pico eNB Cell Edge 520*a* is enclosed fully by the cell defined by the service area of Repeater 540.

It would be beneficial for the macro up-link repeater to have a digital stage that allows digital filtering of the repeated signal. Frequencies outside of the macro carrier frequency band should be attenuated. However, the delay through the repeater should be less than the length of the cyclic prefix used in the OFDM signal (typically 4.7 microseconds for LTE). To ensure the delay is short enough, the number of FIR taps used in the digital filtering should be limited. In general, a delay below 4.7 microseconds for a repeater with digital filtering is easy to achieve for LTE applications. However, some repeater implementations comprising digital echo cancellation add delay to ease the estimation of feedback coupling between the antennas. Such repeaters should be avoided if it results in delays greater than 4.7 microseconds.

Figure 8A:
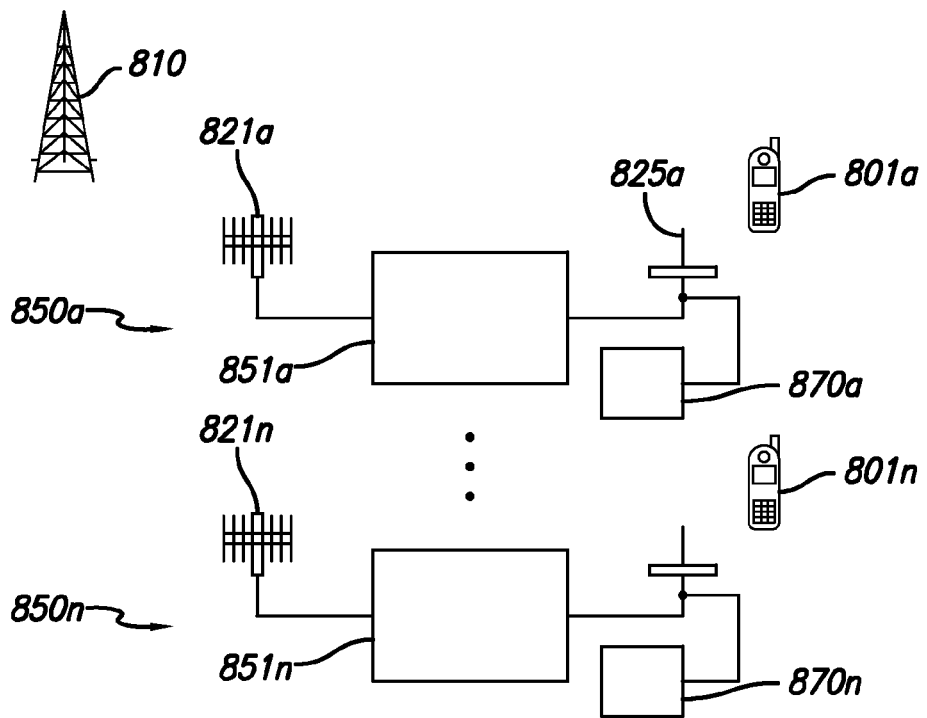
FIG. 8A is a system block diagram of a plurality of repeaters co-located with a pico eNBs in which co-location is achieved by employing the same antenna for the repeater service antenna and the pico eNB.
Figure 8B:
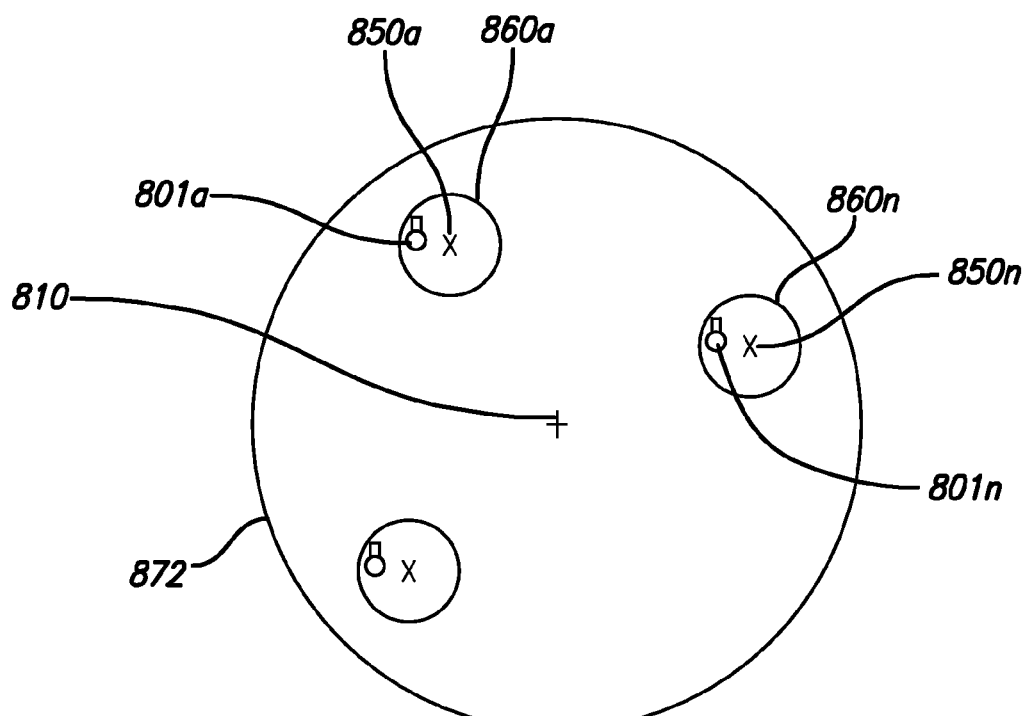
FIG. 8B is a representation of a heterogeneous network having a plurality of co-located pico eNBs and macro up-link repeaters in one or more embodiments of the present invention.

FIG. 8A presents a system block diagram of an embodiment comprising a plurality of co-located pico eNB and repeater combinations 850*a*-850*n*, each comprising repeater circuitry 851*a*-851*n*, repeater donor antennas 821*a*-821*n* and repeater service antennas 825*a*-825*n*, co-located with respective pico eNBs 870*a*-870*n*. Co-located pico eNBs 870*a*-870*n* preferably employ/share repeater service antennas 825*a*-825*n*, respectively, as illustrated schematically in FIG. 8A. FIG. 8B is a representation of the resulting heterogeneous network. Macro eNB 810 has a corresponding macro cell edge 872 which encapsulates the plural co-located pico eNB/repeater combinations 850*a*-850*n*. When UE 801*a* (or 801*n*) is within the service area 860*a* (or 860*n*) of the respective co-located pico eNB/repeater 850*a*-850*n*, UE 801 communicates with repeater via the service antenna 825, and the signals are processed by the repeater circuitry 851 and then fed to the donor antenna 821. Donor antenna 821 then sends a higher power directional beam to macro eNB 810. This prevents the increase in UE power and desensitization of the pico eNB as discussed above.

The present invention has been described primarily to prevent the desensitization of a pico evolved node B ("eNB") receiver by co-locating an up-link repeater with the pico eNB and placing such co-located pico eNB and macro up-link repeater in a heterogeneous network. In this regard, the foregoing description of the pico eNB, the repeater, and the macro eNB is presented for purposes of illustration and description. Furthermore, the description is not intended to limit the invention to the form disclosed herein. Any system comprising any one or more of macro cells, pico cells, femto cells, micro cells or a distribution of cells are within the spirit of this invention. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A wireless communication system, comprising:
    a first base station configured for communication within a first cell and operating in a first carrier band;
    a second base station configured for communication within a second cell and operating in a second carrier band that is distinct from the first carrier band, wherein the second cell is smaller than the first cell and configured within the first cell;
    a repeater co-located with the second base station, wherein the repeater is configured for receiving signals with a repeater service antenna within a service area and re-transmitting the received signals with a donor antenna as a directed beam to the first base station the repeater includes a filter to attenuate frequencies outside of the first carrier band wherein the first repeater service antenna has an omni-directional cardioid pattern with a null placed in the direction of the first base station; a plurality of additional base stations each configured for communication within a corresponding plurality of additional cells, wherein each additional cell is smaller than the first cell and is located within the first cell; and
    a plurality of additional repeaters each co-located with a corresponding additional base station, wherein each additional repeater is configured for receiving signals with an additional repeater service antenna within a corresponding additional service area and re-transmitting the received signals with an additional repeater donor antenna as a directed beam to the first base station, wherein each of the additional repeater service antennas has an omni-directional cardioid pattern with a null placed in the direction of the first base station.

2. The wireless communication system according to claim 1, further comprising user equipment (UE) located within the service area, wherein the UE is configured for transmitting the signals to the repeater and wherein the filter of the repeater filters and amplifies up-link and down-link signals.

3. The wireless communication system according to claim 2, wherein the second base station further includes a second base station antenna, wherein the repeater service antenna is configured for communication with the UE and wherein the repeater includes a down-link amplifier, a first down-link filter, a second down-link filter, an up-link amplifier, a first up-link filter and a second up-link filter.

4. The wireless communication system according to claim 3, wherein the transmission power of the UE is established such that receiver desensitization of the second base station antenna is avoided.

5. The wireless communication system according to claim 4, wherein the repeater co-located with the second base station further includes the second base station antenna comprising the repeater service antenna.

6. The wireless communication system according to claim 4, wherein the repeater co-located with the second base station further includes the second base station and the repeater each affixed to the same tower.

7. The wireless communication system according to claim 2, wherein the service area includes a region in which the first base station receives signals emitted by the UE via the repeater that are greater than signals sent directly from the UE to the first base station.

8. The wireless communication system according to claim 7, wherein the second cell is enclosed within the service area.

9. The wireless communication system of claim 2, wherein the wireless system includes a Long Term Evolution ("LTE") system, wherein the first base station includes a macro evolved node B (eNB), the repeater includes a macro up-link repeater, and the second base station includes a pico eNB.

10. A method for wireless communication, comprising:
receiving signals emitted by a first user equipment (UE) by a first base station within a service area, wherein the first base station operates in a first carrier band;
receiving signals emitted by the first user equipment (UE) by a repeater with a repeater service antenna within a service area using a service antenna, wherein the service antenna has an omni-directional cardioid pattern with a null placed in the direction of the first base station;
re-transmitting the received signals as a directed beam using a donor antenna to the first base station, wherein the received signals are filtered to attenuate frequencies outside of the first carrier band;
establishing combined signal levels of received signals from the first UE and from the repeater at the first base station;
reducing the transmission power of the first UE such that desensitization of a receiver of a second transmission device operating in a second carrier band that is different from the first carrier band is avoided based on said combined received signal levels; providing a plurality of additional base stations each configured for communication within a corresponding plurality of additional cells, wherein each additional cell is smaller than the first cell and is located within the first cell; and providing a plurality of additional repeaters each co-located with a corresponding additional base station, wherein each additional repeater is configured for receiving signals with an additional repeater service antenna within a corresponding additional service area and re-transmitting the received signals with an additional repeater donor antenna as a directed beam to the first base station, wherein each of the additional repeater service antennas has an omni-directional cardioid pattern with a null placed in the direction of the first base station.

11. The method according to claim 10,
wherein the service area includes a region in which the first base station receives signals emitted by the UE via the repeater that are greater than the signals sent directly from the UE to the first base station, and
wherein the second transmission device is enclosed within the service area.

12. The method according to claim 10, wherein the service area is defined by a region in which the first base station receives signals emitted by the first UE via the repeater that are greater than the signals sent directly from the first UE to the first base station.

13. The method according to claim 12, wherein the second transmission device communicates within a second cell that is enclosed within the service area.

14. The method according to claim 10, wherein the repeater, the first base station, and the second transmission device comprise a Long Term evolution ("LTE") system, wherein the repeater further includes a macro up-link repeater, the first base station further includes a macro evolved node B (eNB), and the second base station further includes a pico evolved node B (eNB).

15. A method for wireless communication, comprising:
transmitting signals employing a first base station to a User Equipment (UE) located within a first cell, wherein the first base station operates in a first carrier band;
determining whether the UE is within a service area of a repeater co-located with a second base station that operates in a second carrier band different from the first carrier band, wherein the repeater co-located with the second base station is one of a plurality of repeaters co-located with a plurality of second base stations each having second base station cell smaller than the first cell and configured within the first cell and wherein the repeater includes a filter for attenuating frequencies outside of the first carrier band;
establishing the transmission power level of the UE;
receiving signals emitted from the UE by the repeater with a repeater service antenna; and,
re-transmitting the received signals with a donor antenna as a directed beam to the first base station, wherein the service antenna has an omni-directional cardioid pattern with a null placed in the direction of the first base station.

16. The method according to claim 15, further comprising:
transmitting signals to the UE from the second base station using a first antenna,
wherein the first antenna is the repeater service antenna.

17. The method according to claim 15, wherein establishing the transmission power level of the UE further comprises establishing the transmission power of the UE such that receiver desensitization of the first antenna is avoided.

18. The method according to claim 15, wherein the repeater, the first base station, and the second base station comprise a Long Term evolution ("LTE") system, wherein the repeater further includes a macro up-link repeater, the first base station further includes a macro evolved node B (eNB), and the second base station further includes a pico evolved node B (eNB).

* * * * *